(12) United States Patent
Li et al.

(10) Patent No.: US 11,833,888 B2
(45) Date of Patent: Dec. 5, 2023

(54) METHOD AND SYSTEM FOR PROTECTING AGAINST LOW REFRIGERANT CHARGE IN ELECTRIFIED VEHICLE

(71) Applicant: FORD GLOBAL TECHNOLOGIES, LLC, Dearborn, MI (US)

(72) Inventors: Changchun Li, Bloomfield Hills, MI (US); Jianqing Xu, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 93 days.

(21) Appl. No.: 17/668,617

(22) Filed: Feb. 10, 2022

(65) Prior Publication Data

US 2023/0249522 A1 Aug. 10, 2023

(51) Int. Cl.
*B60H 1/32* (2006.01)
*B60H 1/00* (2006.01)

(52) U.S. Cl.
CPC ........... *B60H 1/3225* (2013.01); *B60H 1/004* (2013.01); *B60H 1/00278* (2013.01); *B60H 1/3205* (2013.01); *B60H 2001/325* (2013.01); *B60H 2001/3238* (2013.01); *B60H 2001/3255* (2013.01); *B60H 2001/3272* (2013.01)

(58) Field of Classification Search
CPC .. B60H 1/3225; B60H 1/00278; B60H 1/004; B60H 1/3205; B60H 2001/3238; B60H 2001/325; B60H 2001/3255; B60H 2001/3272; F25B 2600/05; F25B 2700/171; F25B 2700/1933
See application file for complete search history.

(56) References Cited

U.S. PATENT DOCUMENTS

| | | | |
|---|---|---|---|
| 5,201,862 A | 4/1993 | Pettitt | |
| 5,285,648 A * | 2/1994 | Bessler | H01H 35/24 200/83 P |
| 5,457,965 A | 10/1995 | Blair et al. | |
| 5,481,884 A | 1/1996 | Scoccia | |
| 5,586,445 A | 12/1996 | Bessler | |
| 8,205,461 B2 | 6/2012 | Johnston et al. | |
| 11,022,346 B2 | 6/2021 | Sun et al. | |
| 11,131,471 B1 * | 9/2021 | Butler | F25B 49/02 |
| 2005/0262855 A1 | 12/2005 | Hsieh et al. | |
| 2019/0275911 A1 * | 9/2019 | Albrecht | H01M 10/617 |
| 2021/0344060 A1 * | 11/2021 | Charoulet | H01M 10/6568 |

FOREIGN PATENT DOCUMENTS

CN 112424545 A 2/2021

* cited by examiner

*Primary Examiner* — Marc E Norman
(74) *Attorney, Agent, or Firm* — David B. Kelley; Brooks Kushman. P.C.

(57) ABSTRACT

A system and method for protecting against low refrigerant charge of a refrigerant subsystem in a vehicle includes a controller configured to control a component of the vehicle in response to detecting a low refrigerant charge based on an ambient temperature of the refrigerant subsystem, a suction pressure of refrigerant entering a compressor of the refrigerant subsystem, and a speed of the compressor.

14 Claims, 4 Drawing Sheets

METHOD AND SYSTEM FOR PROTECTING AGAINST LOW REFRIGERANT CHARGE IN ELECTRIFIED VEHICLE

TECHNICAL FIELD

The present invention relates to protecting against low refrigerant charge of a refrigeration system configured to cool a traction battery of an electrified vehicle.

BACKGROUND

An electrified vehicle includes a traction battery for providing power to a motor of the vehicle to propel the vehicle. The temperature of the traction battery during its operation should be kept within an optimal temperature range. Many electrified vehicles include a thermal management system that manages thermal demands of vehicle components including the traction battery during operation. Certain thermal management systems include a refrigeration system that uses a refrigerant for providing active cooling of the traction battery.

SUMMARY

A system for protecting against low refrigerant charge of a refrigerant subsystem in a vehicle is provided. The system includes a controller configured to control a component of the vehicle in response to detecting a low refrigerant charge based on an ambient temperature of the refrigerant subsystem, a suction pressure of refrigerant entering a compressor of the refrigerant subsystem, and a speed of the compressor.

The controller may be further configured to detect the low refrigerant charge when the speed of the compressor is less than a first compressor speed threshold and the suction pressure is less than a variable suction pressure threshold. The first compressor speed threshold and the variable suction pressure threshold may vary as a function of the ambient temperature. The variable suction pressure threshold may further vary inversely as a function of the speed of the compressor.

The controller may be further configured to detect the low refrigerant charge when the speed of the compressor is less than the first compressor speed threshold and the suction pressure is less than the variable suction pressure threshold and greater than a first fixed suction pressure threshold.

The controller may be further configured to detect the low refrigerant charge when the speed of the compressor is less than the first compressor speed threshold and greater than a second compressor speed threshold and the suction pressure is less than the first fixed suction pressure threshold and greater than a second fixed suction pressure threshold. The second compressor speed threshold may vary as a function of the ambient temperature.

The controller may be further configured to shut off the compressor when the speed of the compressor is less than the second compressor speed threshold and the suction pressure is less than the second fixed suction pressure threshold.

The controller may be further configured to detect a sufficient refrigerant charge when the speed of the compressor is less than the first compressor speed threshold and the suction pressure is greater than the variable suction pressure threshold.

The controller may be further configured to detect a sufficient refrigerant charge when the speed of the compressor is greater than the first compressor speed threshold. In this case, the controller may be further configured to incrementally reduce the speed of the compressor by a variable reduced compressor speed amount until the suction pressure becomes greater than a first fixed suction pressure threshold while the speed of the compressor is greater than the first compressor speed threshold. The variable reduced compressor speed amount may vary as a function of the ambient temperature.

The system may further include a temperature sensor for sensing the ambient temperature of the refrigerant subsystem, a pressure sensor for sensing the suction pressure of refrigerant entering the compressor, and a speed sensor for sensing the speed of the compressor. The temperature sensor, the pressure sensor, and the speed sensor are in communication with the controller.

Further, an electrified vehicle including a traction battery is provided. The vehicle further includes a refrigerant subsystem configured to cool the traction battery and a controller. The controller is configured to control a component of the vehicle in response to detecting a low refrigerant charge based on an ambient temperature of the refrigerant subsystem, a suction pressure of refrigerant entering a compressor of the refrigerant subsystem, and a speed of the compressor.

The component of the vehicle may be the traction battery, one or more components of the refrigerant subsystem, an indicator of the vehicle, and/or the compressor of the refrigerant subsystem.

Also, a method for protecting against low refrigerant charge of a refrigerant subsystem in a vehicle is provided. The method includes detecting, by a controller in communication with the refrigerant subsystem, a low refrigerant charge based on an ambient temperature of the refrigerant subsystem, a suction pressure of refrigerant entering a compressor of the refrigerant subsystem, and a speed of the compressor. The method further includes controlling, by the controller, one or more components of the refrigerant system and/or one or more components of the vehicle configured to be cooled by the refrigerant subsystem, in response to the low refrigerant charge.

DETAILED DESCRIPTION

Detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
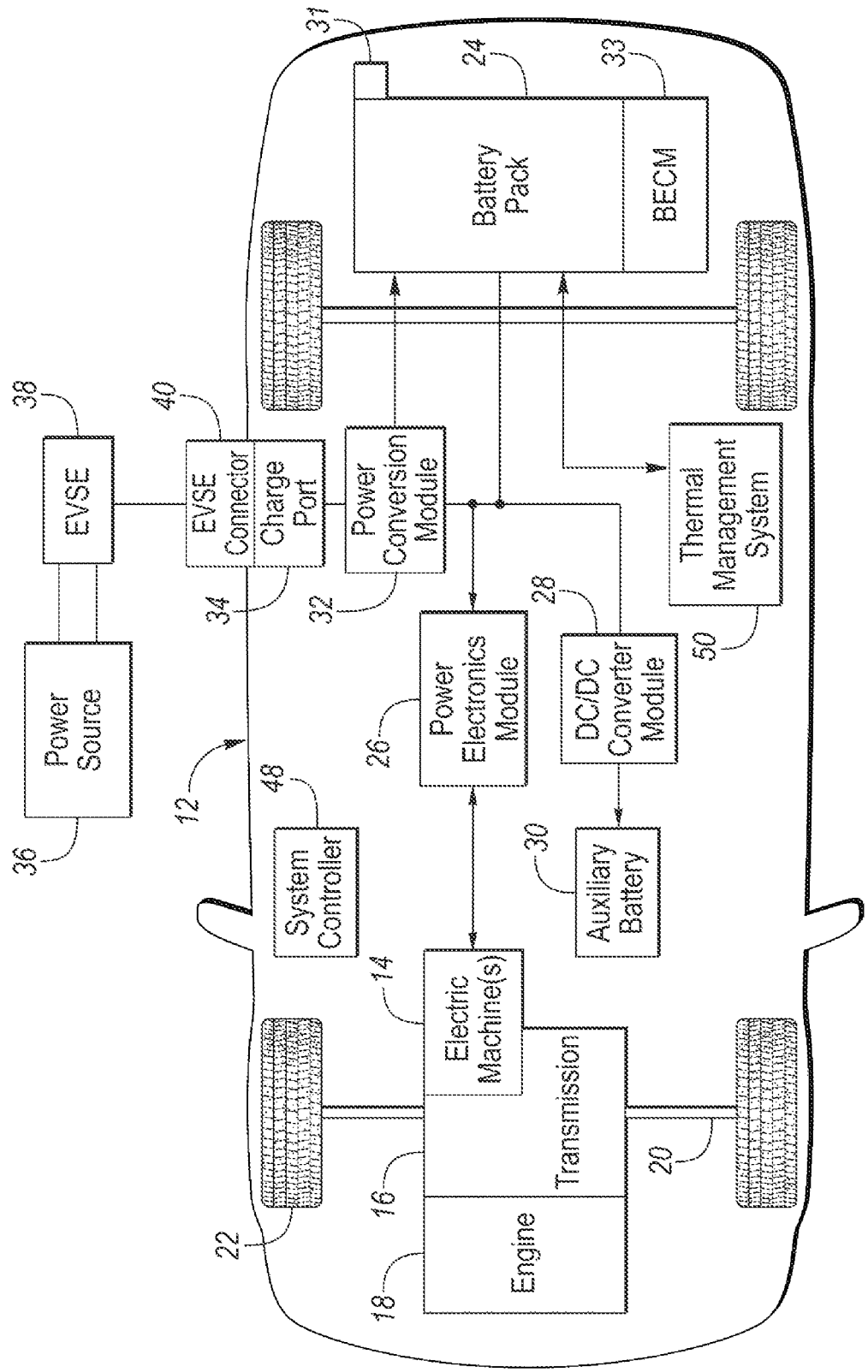
FIG. 1 illustrates a block diagram of an electrified vehicle.

Referring now to FIG. 1, a block diagram of an exemplary electrified vehicle 12 is shown. In this example, electrified vehicle 12 is a plug-in hybrid electric vehicle (PHEV) having an engine 18 and a traction battery 24. In other embodiments, electrified vehicle 12 is a non-plug-in hybrid electric vehicle. In other embodiments, electrified vehicle 12 is battery electric vehicle (BEV). In a BEV configuration, electrified vehicle 12 does not include engine 18.

Electrified vehicle 12 includes one or more electric machines 14 mechanically connected to a transmission 16. Electric machine 14 is capable of operating as a motor and as a generator. Transmission 16 is mechanically connected to engine 18 and to a drive shaft 20 mechanically connected to wheels 22. Electric machine 14 can provide propulsion and deceleration capability while engine 18 is turned on or off. Electric machine 14 acting as a generator can recover energy that may normally be lost as heat in a friction braking system. Electric machine 14 may reduce vehicle emissions by allowing engine 18 to operate at more efficient speeds and allowing electrified vehicle 12 to be operated in electric mode with engine 18 off under certain conditions.

Traction battery 24 stores electrical energy that can be used by electric machine 14 for propelling electrified vehicle 12. Traction battery 24 typically provides a high-voltage (HV) direct current (DC) output. Traction battery 24 is electrically connected to a power electronics module 26 which is electrically connected to electric machine 14. Power electronics module 26 provides the ability to bi-directionally transfer energy between traction battery 24 and the electric machine. For example, traction battery 24 may provide a DC voltage while electric machine 14 may require a three-phase alternating current (AC) current to function. Power electronics module 26 may convert the DC voltage to a three-phase AC current to operate electric machine 14. In a regenerative mode, power electronics module 26 may convert three-phase AC current from electric machine 14 acting as a generator to DC voltage compatible with traction battery 24.

In addition to providing energy for propulsion, traction battery 24 may provide energy for other vehicle electrical systems. A typical vehicle electrical system may include a DC/DC converter module 28 that converts the high voltage DC output of traction battery 24 to a low voltage DC supply compatible with other vehicle components. Other high-voltage loads, such as compressors and electric heaters, may be connected directly to the high-voltage supply without the use of DC/DC converter module 28. Typically, the low-voltage systems are electrically connected to an auxiliary battery 30 (e.g., a twelve-volt DC battery).

A battery energy control module (BECM) 33 may be in communication with traction battery 24. BECM 33 may act as a controller for traction battery 24 and may include an electronic monitoring system that manages temperature and charge state of battery cells of traction battery 24. Traction battery 24 may have a temperature sensor 31 such as a thermistor or other temperature gauge. Temperature sensor 31 may be in communication with BECM 33 to provide temperature data regarding traction battery 24.

Traction battery 24 is rechargeable by an external power source 36 (e.g., the grid). Electric vehicle supply equipment (EVSE) 38 is connected to external power source 36. EVSE 38 provides circuitry and controls to control and manage the transfer of energy between external power source 36 and electrified vehicle 12. External power source 36 may provide DC or AC electric power to EVSE 38. EVSE 38 may have a charge connector 40 for plugging into a charge port 34 of electrified vehicle 12. Charge port 34 may be any type of port configured to transfer power from EVSE 38 to electrified vehicle 12. A power conversion module 32 of electrified vehicle 12 may condition power supplied from EVSE 38 to provide the proper voltage and current levels to traction battery 24. Power conversion module 32 may interface with EVSE 38 to coordinate the delivery of power to traction battery 24. Alternatively, various components described as being electrically connected may transfer power using a wireless inductive coupling.

The charging of traction battery 24 causes the traction battery to be heated. More heat is produced as the charging current/voltage is increased. As such, actively cooling traction battery 24 may prevent overheating.

The various components described above may have one or more associated controllers to control and monitor the operation of the components. The controllers can be microprocessor-based devices. The controllers may communicate via a serial bus (e.g., Controller Area Network (CAN)) or via discrete conductors.

For example, a system controller 48 ("vehicle controller") is present to coordinate the operation of the various components. Controller 48 includes electronics, software, or both, to perform the necessary control functions for operating electrified vehicle 12. In embodiments, controller 48 is a combination vehicle system controller and powertrain control module (VSC/PCM). Although controller 48 is shown as a single device, controller 48 may include multiple controllers in the form of multiple hardware devices, or multiple software controllers with one or more hardware devices. In this regard, a reference to a "controller" herein may refer to one or more controllers.

Electrified vehicle 12 further includes a thermal management system 50. Thermal management system 50 is configured to thermally control traction battery 24. Thermal management system 50 may also be configured to thermally control other vehicle components. Thermal management system 50 includes a refrigeration system 52 (shown in FIG. 2) operable to keep the temperature of traction battery 24 within an optimal temperature range during operation of the traction battery, including while the traction battery is being charged via EVSE 38, while the traction battery is providing electrical energy for propelling electrified vehicle 12, and while the traction battery is being charged with regenerative energy.

Figure 2:
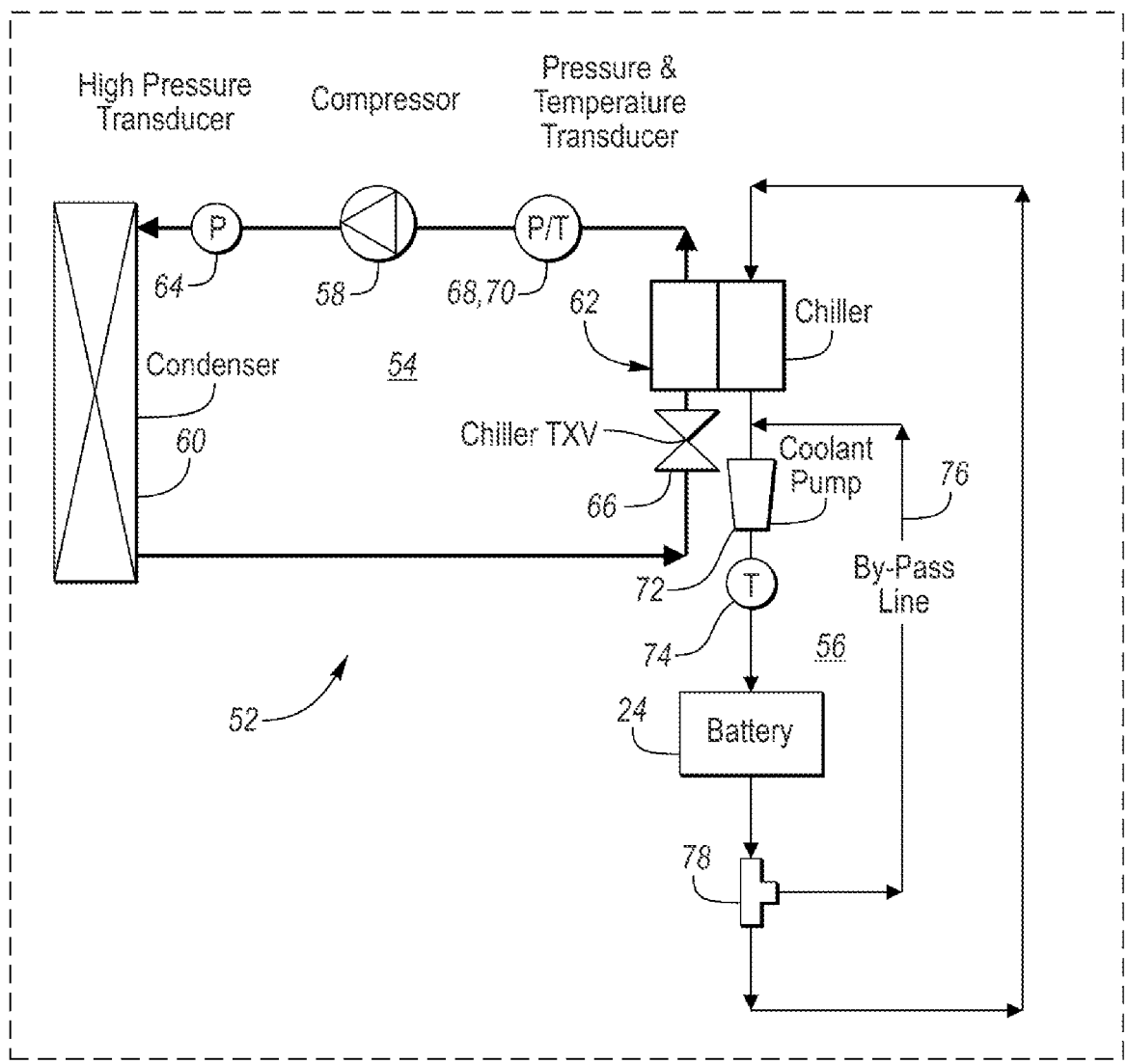
FIG. 2 illustrates a schematic diagram of a refrigeration system of a thermal management system of the electrified vehicle, the refrigeration system having a refrigerant subsystem and a coolant subsystem.

Referring now to FIG. 2, with continual reference to FIG. 1, a schematic diagram of refrigeration system 52 of thermal management system 50 is shown. Refrigeration system 52 is configured to selectively circulate a refrigerant and a coolant for actively cooling traction battery 24 during operating conditions. As known to those of ordinary skill in the art, refrigeration system 52 generally includes one or more compressors, heat exchangers (evaporators, chillers, air cooled/water cooled condensers, outside heat exchangers), and/or thermal expansion valves.

In this exemplary embodiment, refrigeration system 52 includes a refrigerant subsystem 54 and a coolant subsystem 56. Refrigerant subsystem 54 forms a refrigerant loop for circulating the refrigerant therethrough. Coolant subsystem 56 forms a coolant loop for circulating the coolant to traction battery 24 to cool the traction battery. As known to those of ordinary skill in the art, refrigerant subsystem 54 and coolant subsystem 56 interact for heat from the coolant to be transferred to the refrigerant.

In this exemplary embodiment, refrigerant subsystem 54 includes a compressor 58, a condenser 60, and a chiller 62. In operation, compressor 58 pressurizes refrigerant from a liquid into a vapor. Condenser 60 receives the refrigerant exiting compressor 58 and transfers heat from the refrigerant to the surrounding environment by condensing the refrigerant from vapor back to liquid. Chiller 62 receives the refrigerant exiting condenser 60 via a chiller thermal expansion valve (TEV) 66. Chiller TEV 66 is adapted to change the pressure of the refrigerant. Within chiller 62, the refrigerant exchanges heat with warmer coolant of coolant subsystem 56 which thereby causes the refrigerant to be heated and the coolant to be cooled. Compressor 58 receives the refrigerant from chiller 62 for recirculation through the refrigerant loop. Refrigerant subsystem 54 further includes a high-pressure sensor 64 for monitoring the pressure of the refrigerant exiting compressor 58, a temperature sensor 68 for monitoring the temperature of the refrigerant entering compressor 58, and a low-pressure sensor 70 for monitoring the temperature of the refrigerant entering compressor 58.

In this exemplary embodiment, coolant subsystem 56 includes chiller 62 and a coolant pump 72. In operation, coolant pump 72 pumps cooled coolant from chiller 62 to traction battery 24. The cooled coolant enters traction battery 24 via an inlet of a coolant passage (not shown) extending through or alongside the traction battery, travels through the coolant passage, and exits the traction battery via an outlet of the coolant passage. The coolant absorbs heat from traction battery 24 to thereby cool the traction battery as the coolant travels through the coolant passage. In this way, traction battery 24 is cooled by refrigeration system 52. Chiller 62 receives the heated coolant exiting traction battery 24. As described above, within chiller 62, heat from the heated coolant is exchanged to the refrigerant of refrigerant subsystem 54 which thereby causes the refrigerant to be heated and the coolant to be cooled. Coolant pump 72 receives the cooled coolant from chiller 62 for recirculation through the coolant loop. Coolant subsystem 56 further includes a temperature sensor 74 for monitoring the temperature of coolant provided to traction battery 24.

Coolant subsystem 56 further includes a bypass line 76 connected between the outlet and the inlet of the coolant passage. Bypass line 76 allows coolant to bypass chiller 62. A selectively activatable valve 78 is used to control the circulation of coolant through bypass line 76. For instance, valve 78 is activated to circulate coolant through bypass line 76 when the temperature of the coolant exiting traction battery 24 is determined to not be warm enough to require cooling by chiller 62.

Refrigeration system 52 further includes a controller (not shown in FIG. 2) such as controller 48. Controller 48 is in communication with and is operable to control operation of compressor 58, condenser 60, and chiller 62 of refrigerant subsystem 54. Controller 48 is further in communication with high-pressure sensor 64 to monitor the pressure of the refrigerant exiting compressor 58, temperature sensor 68 to monitor the temperature of the refrigerant entering compressor 58, and low-pressure sensor 70 to monitor the temperature of the refrigerant entering compressor 58.

Controller 48 is also in communication with and is operable to control operation of chiller 62, coolant pump 72, and valve 78 of coolant subsystem 56. Controller 48 is further in communication with temperature sensor 74 to monitor the temperature of the coolant entering traction battery 24.

"Refrigerant charge" is a term indicative of a level of the refrigerant of refrigeration system 52. An overcharged refrigeration system has too much refrigerant and an undercharged refrigeration system has too little refrigerant. A problem with refrigeration system 52 is that leakage of the refrigerant, such as through hose and fittings, can cause low refrigerant charge. Low refrigerant charge can lead to insufficient cooling of traction battery 24 as well as insufficient cooling of other vehicle components, such as cabin cooling and electronics cooling, handled by refrigeration system 52. Further, low refrigerant charge can cause elevated operating temperatures of compressor 58 of refrigerant subsystem 54 as a result of reduced mass flow rate, and lower lubricating oil flow of compressor 58.

A problem with conventional low refrigerant charge protection based on the high-pressure refrigerant sensor (e.g., high-pressure sensor 64 of refrigerant subsystem 54) is that the low refrigerant charge status cannot be detected early enough.

A low refrigerant charge protection strategy in accordance with embodiments of the present invention ("the low refrigerant charge protection strategy") protects against low refrigerant charge by using innovative solutions to detect low refrigerant charge in refrigeration systems for electrified vehicles. These innovative solutions enable the low refrigerant charge protection strategy to detect low refrigerant charge status relatively earlier.

In further detail, the low refrigerant charge protection strategy provides accurate and early low refrigerant charge detection for refrigerant subsystems equipped with a suction-side pressure sensor (e.g., low-pressure sensor 70 of refrigerant subsystem 54) in refrigeration systems for electrified vehicles. The low refrigerant charge protection strategy uses the low-pressure (i.e., suction-side pressure) of the refrigerant in refrigerant subsystem 54 (i.e., the pressure of the refrigerant entering compressor 58 as measured by low-pressure sensor 70) as an index for detecting low refrigerant charge. More particularly, the low refrigerant charge protection strategy uses a combination of the following factors in detecting low refrigerant charge: (i) suction-side pressure (i.e., the refrigerant pressure measured by low-pressure sensor 70), (ii) ambient temperature of refrigerant subsystem 54 (such as measured by temperature sensor 68 or some other temperature sensor of refrigerant subsystem 54), and (iii) speed of compressor 58 (such as measured by a speed sensor (not shown) associated with compressor 58).

Controller 48 implements the low refrigerant charge protection strategy. In this regard, controller 48 processes monitored sensor output signals, including suction-side pressure, ambient temperature, and compressor speed, according to a low refrigerant charge detection algorithm (described in greater detail with respect to FIG. 3) of the low refrigerant charge protection strategy. Controller 48 produces a low refrigerant charge signal whenever low refrigerant charge is detected.

Controller 48 using the suction-side pressure as an index for detecting low refrigerant charge enables low refrigerant charge detection sooner than using the high-side pressure sensor. As a result, controller 48 can act relatively sooner in controlling traction battery 24, refrigeration system 52, and/or other vehicle components before damage may occur in the event of low refrigerant charge.

Figure 3:
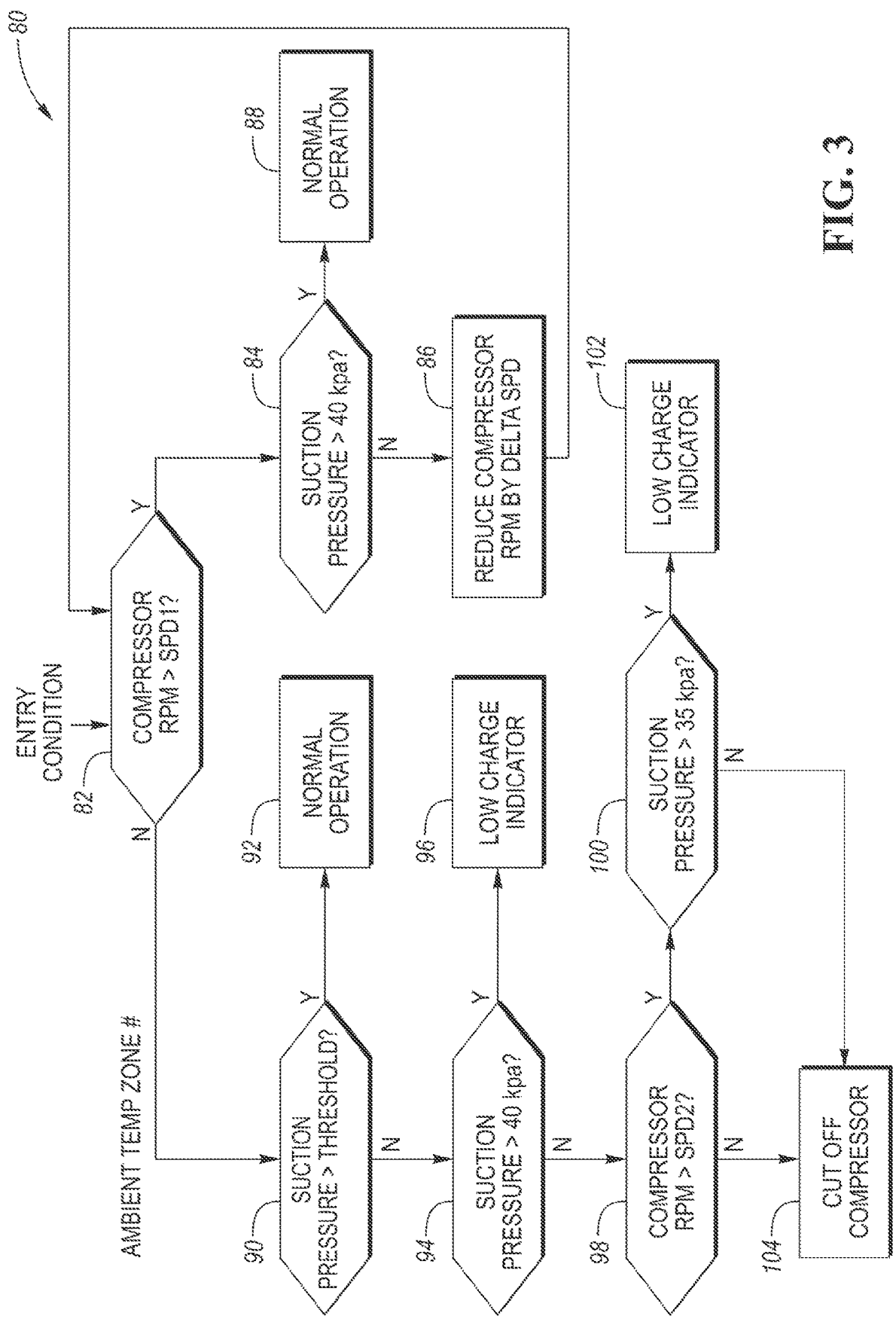
FIG. 3 illustrates a flowchart depicting operation of a low refrigerant charge protection strategy implemented by a controller of the electrified vehicle for protecting against low refrigerant charge of the refrigeration system.

Referring now to FIG. 3, with continual reference to FIGS. 1 and 2, a flowchart 80 depicting operation of the low refrigerant charge protection strategy implemented by controller 48 for protecting against low refrigerant charge is shown.

Initially, since the ambient temperature of refrigerant subsystem 54 significantly influences the pressure of the refrigerant, the low refrigerant charge detection algorithm of the low refrigerant charge protection strategy is implemented under different temperature zones based on ambient temperatures.

At each individual temperature zone, a compressor speed threshold is designed to separate the operation into either (i) a "compressor speed control zone" or (ii) a "low charge detection zone". In this regard, as shown in flowchart 80, the operation of the low refrigerant charge protection strategy, following detection of the ambient temperature within a corresponding ambient temperature zone, initially includes the "Entry Condition" of controller 48 comparing the speed of compressor 58 to a variable first compressor speed threshold (SPD1), as indicated in block 82.

The first compressor speed threshold (SPD1) is calibratable and depends on the ambient temperature zone. For instance, the first compressor speed threshold (SPD1) is 4000 rpm for a "hottest" ambient temperature zone (i.e., when the ambient temperature of refrigerant system 54 is above a "hottest" temperature) whereas the first compressor speed threshold (SPD1) is 890 rpm for a "coldest" ambient temperature zone (i.e., when the ambient temperature of refrigerant system 54 is below a "coldest" temperature).

When the compressor speed is greater than the first compressor speed threshold (SPD1), the operation continues in the compressor speed control zone. In the compressor speed control zone, the operation includes controller 48 comparing the suction pressure (i.e., the refrigerant pressure measured by low-pressure sensor 70 of refrigerant subsystem 54) with a predetermined first suction pressure threshold (e.g., 40 kPa), as indicated by block 84. When the suction pressure is below the first suction pressure threshold (40 kPa), controller 48 controls compressor 58 to reduce the compressor speed by a variable reduced compressor speed amount (DeltaSPD), as indicated in block 86.

The reduced compressor speed amount (DeltaSPD) is also calibratable and depends on the ambient temperature zone. For instance, the reduced compressor speed amount (DeltaSPD) is 500 rpm for the hottest ambient temperature zone whereas the reduced compressor speed amount (DeltaSPD) is 50 rpm for the coldest ambient temperature zone.

Reducing the compressor speed causes the suction pressure to increase. The comparison of the suction pressure with the first suction pressure threshold (40 kPa) and the reduction of the compressor speed by the reduced compressor speed amount (DeltaSPD) continues until the suction pressure becomes greater than the first suction pressure threshold. When the suction pressure becomes greater than the first suction pressure threshold, controller 48 further controls refrigeration system 52 under normal operation as indicated in block 88.

As described, in the compressor speed control zone, when the suction pressure falls below the first suction pressure threshold (40 kPa), controller 48 first reduces the speed of compressor 58. Controller 48 makes no refrigerant charge level decision in the compressor speed control zone due to the following two reasons. First, the suction pressure will not have accurate resolution to distinguish different refrigerant charge levels. Second, from a compressor reliability standpoint, the control algorithm involves controller 48 commanding compressor 54 to reduce speed when the suction pressure falls below the first suction pressure threshold.

When the compressor speed is less than the first compressor speed threshold (SPD1), the operation continues in the low charge detection zone. In the low charge detection zone, the operation includes controller 48 comparing the suction pressure with a variable suction pressure threshold, as indicated in block 90. If the suction pressure is greater than the variable suction pressure threshold, then controller 48 further controls refrigeration system 52 under normal operation as indicated in block 92.

The variable suction pressure threshold is also calibratable and depends on the ambient temperature zone and is an inverse function of the speed of compressor 58. For instance, for the hottest ambient temperature zone, when the compressor speed is less than 800 rpm, the variable suction pressure threshold is 273.7 kPA; when the compressor speed is greater than 800 rpm and less than 2000 rpm, the variable suction pressure threshold is 125.4 kPA; and when the compressor speed is greater than 2000 rpm and less than 8600 rpm, the variable suction pressure threshold is 40 kPa. Conversely, for instance, for the coldest ambient temperature zone, when the compressor speed is less than 800 rpm, the variable suction pressure threshold is 44.41 kPA; and when the compressor speed is greater than 800 rpm and less than 8600 rpm, the variable suction pressure threshold is 40 kPA.

When the suction pressure is less than the variable suction pressure threshold, the operation further includes controller 48 comparing the suction pressure to the predetermined first suction pressure threshold (40 kPa), as indicated in block 94. If the suction pressure is less than the first suction pressure threshold, then controller 48 detects a low refrigerant charge status of refrigeration system 52. In response to detecting the low refrigerant charge, controller 48 generates a low refrigerant charge indicator signal as indicated in block 96. Controller 48 may take other actions in response to the low refrigerant charge status such as reducing or disabling operation of refrigeration system 52 by reducing or disabling operation of compressor 58 and/or other components of the refrigeration system, reducing or disabling operation of activities causing traction battery 24 to be heated (e.g., reducing or disabling the EVSE charging of traction battery 24, reducing or disabling the vehicle propulsion energy of traction battery 24, controlling engine 18 to handle more energy requirements, etc.).

If the suction pressure is less than the predetermined first suction pressure threshold (40 kPa), then the operation further includes controller 48 comparing the speed of compressor 58 to a variable second compressor speed threshold (SPD2), as indicated in block 98. The second compressor speed threshold (SPD2) is also calibratable and depends on the ambient temperature zone. For instance, the second compressor speed threshold (SPD2) is 3500 rpm for the hottest ambient temperature zone whereas the second compressor speed threshold (SPD2) is 840 rpm for the coldest ambient temperature zone. For each ambient temperature zone, the second compressor speed threshold (SPD2) is less than or equal to the first compressor speed threshold (SPD1).

If the speed of compressor 58 is greater than the second compressor speed threshold (SPD2), then the operation further includes controller 48 comparing the suction pressure to a predetermined second suction pressure threshold (e.g., 35 kPa), as indicated by block 100. If the suction pressure is greater than the second suction pressure threshold (35 kPa), then controller 48 detects a low refrigerant charge status of refrigeration system 52. In response to detecting the low refrigerant charge, controller 48 generates a low refrigerant charge indicator signal as indicated in block 102. As indicated above, controller 48 may take other actions in controlling refrigeration system 52 and/or traction battery 24 in response to the low refrigerant charge status. It is noted that the second suction pressure threshold is less than the first suction pressure threshold.

If either the speed of compressor 58 is less than the second compressor speed threshold (SPD2) or the suction pressure is less than the second suction pressure threshold (35 kPa), then the operation further includes controller 48 cutting off compressor 58 (i.e., disabling compressor 58) as indicated in block 104. In addition to cutting off compressor 58, controller 48 may also take other actions indicated above in controlling refrigeration system 52 and/or traction battery 24.

As described, in the low charge detection zone, when the suction pressure falls below the first suction pressure threshold (40 kPa), the control algorithm enables the system to have quick and accurate response to the low refrigerant charge and provide the system low refrigerant charge signal. There are also two reasons that the refrigerant charge level decision is made at this "low charge detection zone". First, the suction pressure will have accurate resolution to distinguish the different refrigerant charge levels at the current "low charge detection zone". Second, from compressor reliability standpoint, the control algorithm provides a diagnostic trouble code (DTC) during system low refrigerant charge or commands the compressor to cut off when the refrigerant charge level is extremely low.

As further described, the first suction pressure threshold, the second suction pressure threshold, and the variable suction pressure threshold, used by the low refrigerant charge protection strategy in detecting for low refrigerant charge, concern the suction pressure of refrigerant of the refrigerant subsystem. The variable first compressor speed threshold (SPD1) and the variable second compressor speed threshold (SPD2), also used by the low refrigerant charge protection strategy in detecting for low refrigerant charge, concern the speed of the compressor of the refrigerant subsystem. The variable reduced compressor speed amount (DeltaSPD), also used by the low refrigerant charge protection strategy in detecting for low refrigerant charge, concerns a controlled reduction in the speed of the compressor.

On one hand, the first suction pressure threshold and the second suction pressure threshold are predetermined and do not vary as a function of the ambient temperature. Further, the first suction pressure threshold is greater than the second suction pressure threshold (e.g., the first pressure threshold is, for example, 40 kPa; and the second suction pressure threshold is, for example, 35 kPa).

On the other hand, the variable first compressor speed threshold (SPD1), the variable second compressor speed threshold (SPD2), and the variable reduced compressor speed amount (DeltaSPD) are calibratable and depend on the ambient temperature zone. The variable suction pressure threshold is also calibratable and depends on the ambient temperature zone and further depends inversely on the compressor speed.

Figure 4:
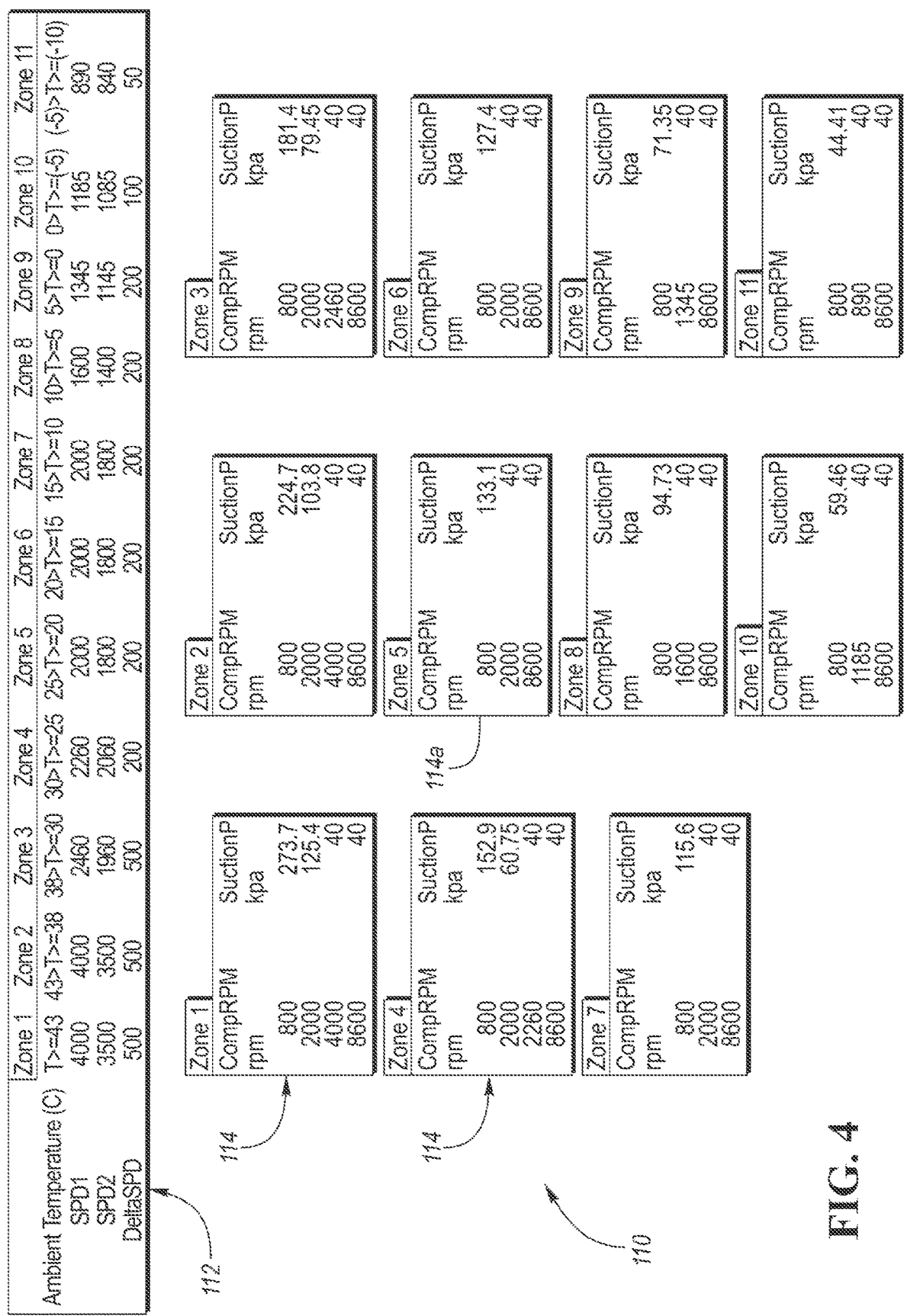
FIG. 4 illustrates an exemplary set of tables of variable compressor speed thresholds, variable reduced compressor speed amounts, and variable suction pressure thresholds for use by the low refrigerant charge protection strategy in detecting for low refrigerant charge, the variable compressor speed thresholds concern the speed of a compressor of the refrigerant subsystem, the variable reduced compressor speed amounts concern a controlled reduction in the speed of the compressor, and the variable suction pressure thresholds concern the suction pressure of refrigerant of the refrigerant subsystem, the variable compressor speed thresholds, the variable reduced compressor speed amounts, and the variable suction pressure thresholds depending on the ambient temperature of the refrigerant subsystem, and the variable suction pressure thresholds further depending inversely on the speed of the compressor.

Referring now to FIG. 4, with continual reference to FIGS. 2 and 3, an exemplary set of tables 110 of variable compressor speed thresholds (SPD1 and SPD2), variable reduced compressor speed amounts (DeltaSPD), and variable suction pressure thresholds for use by the low refrigerant charge protection strategy in detecting for low refrigerant charge is shown.

Exemplary set of tables 110 includes an exemplary table 112 having variable first compressor speed thresholds (SPD1), variable second compressor speed thresholds (SPD2), and variable reduced compressor speed amounts (DeltaSPD) for each of an exemplary set of eleven different ambient temperature zones ("Zone 1" through "Zone 11"). For instance, exemplary table 112 provides that when the ambient temperature of refrigerant system 52 falls in "Zone 5" (i.e., when the ambient temperature is between 20° C. and 25° C.), the first compressor speed threshold (SPD1) is 2000 rpm, the second compressor speed threshold (SPD2) is 1800 rpm, and the reduced compressor speed amount (DeltaSPD) is 200 rpm.

Exemplary set of tables 110 further includes an exemplary sub-table 114 for each ambient temperature zone. Accordingly, as there is an exemplary set of eleven different ambient temperature zones, there are eleven exemplary sub-tables 114. As such, exemplary sub-tables 114 includes an exemplary sub-table 114a associated with ambient temperature Zone 5. Exemplary sub-table 114a includes variable suction pressure thresholds for each of an exemplary set of different compressor speeds when the ambient temperature is in Zone 5. As noted, the variable suction pressure thresholds depend inversely on the speed of the compressor. Exemplary sub-table 114a provides that when the ambient temperature falls in Zone 5, the variable suction pressure threshold is 133.1 kPa when the compressor speed is 800 rpm, the variable suction pressure threshold is 40 kPa when the compressor speed is 2000 rpm, and the variable suction pressure threshold is 40 kPa when the compressor speed is 8000 rpm. The noted compressor speeds may pertain to compressor speed ranges (e.g., the variable suction pressure threshold is 133.1 kPa when the compressor speed is less than 800 rpm and is 40 kPa when the compressor speed greater than 800 rpm).

As described, embodiments of the present invention provide a control strategy, which integrates the pressure of refrigerant entering a compressor of a refrigerant subsystem, the speed of the compressor, and the ambient temperature of the refrigerant sub-system into a control algorithm to accurately detect low refrigerant charge and ensure adequate cooling for the cabin, traction battery, and/or electronic devices for electrified vehicles.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A system for protecting against low refrigerant charge of a refrigerant subsystem in a vehicle, comprising:
   a controller configured to control a component of the vehicle in response to detecting, when a speed of a compressor of the refrigerant subsystem is less than a first compressor speed threshold and a suction pressure of refrigerant entering the compressor is less than a variable suction pressure threshold, a low refrigerant charge based on an ambient temperature of the refrigerant subsystem, the suction pressure, and a speed of the compressor, wherein the first compressor speed threshold and the variable suction pressure threshold vary as a function of the ambient temperature.

2. The system of claim 1 wherein:
the variable suction pressure threshold further varies inversely as a function of the speed of the compressor.

3. The system of claim 1 wherein:
the controller is further configured to detect the low refrigerant charge when the speed of the compressor is less than the first compressor speed threshold and the suction pressure is less than the variable suction pressure threshold and greater than a first fixed suction pressure threshold.

4. The system of claim 3 wherein:
the controller is further configured to detect the low refrigerant charge when the speed of the compressor is less than the first compressor speed threshold and greater than a second compressor speed threshold and the suction pressure is less than the first fixed suction pressure threshold and greater than a second fixed suction pressure threshold, and the second compressor speed threshold varies as a function of the ambient temperature.

5. The system of claim 4 wherein:
the controller is further configured to shut off the compressor when the speed of the compressor is less than the second compressor speed threshold and the suction pressure is less than the second fixed suction pressure threshold.

6. The system of claim 1 wherein:
the controller is further configured to detect a sufficient refrigerant charge when the speed of the compressor is less than the first compressor speed threshold and the suction pressure is greater than the variable suction pressure threshold.

7. The system of claim 1 wherein:
the controller is further configured to detect a sufficient refrigerant charge when the speed of the compressor is greater than the first compressor speed threshold.

8. The system of claim 7 wherein:
the controller is further configured to incrementally reduce the speed of the compressor by a variable reduced compressor speed amount until the suction pressure becomes greater than a first fixed suction pressure threshold while the speed of the compressor is greater than the first compressor speed threshold.

9. The system of claim 8 wherein:
the variable reduced compressor speed amount varies as a function of the ambient temperature.

10. The system of claim 1 further comprising:
a temperature sensor, in communication with the controller, for sensing the ambient temperature of the refrigerant subsystem;
a pressure sensor, in communication with the controller, for sensing the suction pressure of refrigerant entering the compressor; and
a speed sensor, in communication with the controller, for sensing the speed of the compressor.

11. A method for protecting against low refrigerant charge of a refrigerant subsystem in a vehicle, comprising:
detecting, by a controller in communication with the refrigerant subsystem, a low refrigerant charge based on an ambient temperature of the refrigerant subsystem, a suction pressure of refrigerant entering a compressor of the refrigerant subsystem, and a speed of the compressor; and
controlling, by the controller, one or more components of the refrigerant system and/or one or more components of the vehicle configured to be cooled by the refrigerant subsystem, in response to the low refrigerant charge;
wherein detecting the low refrigerant charge includes detecting the low refrigerant charge when the speed of the compressor is less than a first compressor speed threshold and the suction pressure is less than a variable suction pressure threshold; and
the first compressor speed threshold and the variable suction pressure threshold vary as a function of the ambient temperature, and the variable suction pressure threshold further varies inversely as a function of the speed of the compressor.

12. The method of claim 11 wherein:
detecting the low refrigerant charge includes detecting the low refrigerant charge when the speed of the compressor is less than the first compressor speed threshold and greater than a second compressor speed threshold and the suction pressure is less than a first fixed suction pressure threshold, that is less than the variable suction pressure threshold, and greater than a second fixed suction pressure threshold, that is less than the first fixed suction pressure threshold, and the second compressor speed threshold varies as a function of the ambient temperature.

13. The method of claim 12 further comprising:
shutting off the compressor when the speed of the compressor is less than the second compressor speed threshold and the suction pressure is less than the second fixed suction pressure threshold.

14. The method of claim 12 further comprising:
incrementally reducing the speed of the compressor by a variable reduced compressor speed amount until the suction pressure becomes greater than a first fixed suction pressure threshold while the speed of the compressor is greater than the first compressor speed threshold.

* * * * *